May 26, 1964  K. R. JENSEN, JR  3,134,305
PUMP ROD STUFFING BOX ASSEMBLY

Filed Jan. 2, 1963  2 Sheets-Sheet 1

Kresten R. Jensen, Jr.
INVENTOR

May 26, 1964  K. R. JENSEN, JR  3,134,305
PUMP ROD STUFFING BOX ASSEMBLY
Filed Jan. 2, 1963  2 Sheets-Sheet 2

Kresten R. Jensen, Jr.
INVENTOR 3,134,305
PUMP ROD STUFFING BOX ASSEMBLY
Kresten R. Jensen, Jr., 14th and Pacific Sts.,
Coffeyville, Kans.
Filed Jan. 2, 1963, Ser. No. 248,942
4 Claims. (Cl. 92—169)

The present invention relates to oil or water well equipment and in particular to an improved liner for a stuffing box assembly.

It has been a common defect in pump equipment to provide a replaceable liner for a stuffing box and to, of necessity, fabricate the liner from a metal different than the well tube. Under certain conditions galvanic action corrodes the liner and/or the stuffing box or tube.

The primary object of the present invention is to provide a stuffing box assembly having means whereby the liner may be fabricated of a metal galvanically opposed to the metal of the tube without danger of corrosion.

Another object of the present invention is to provide, in a pitless frost proof pump for a well, a replaceable liner for the pump stuffing box, one which may be withdrawn with the internal parts of the pump for cleaning, inspection, or replacement.

Figure 1:
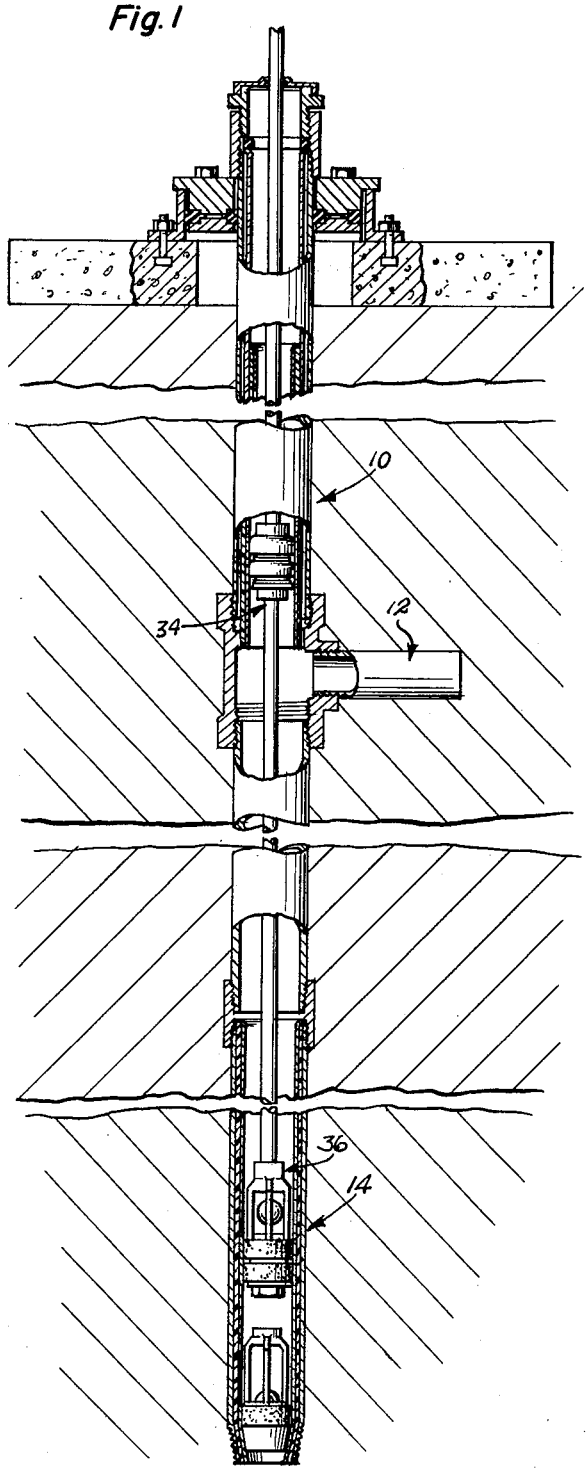
Figure 2:
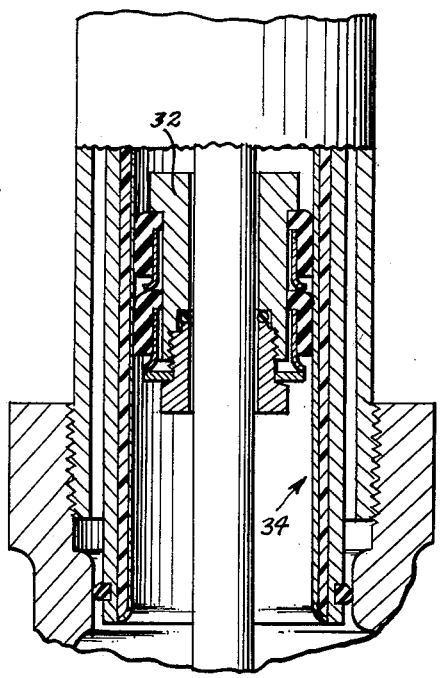
Figure 3:
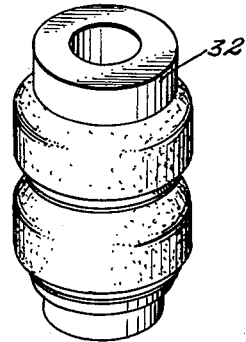
Figure 4:
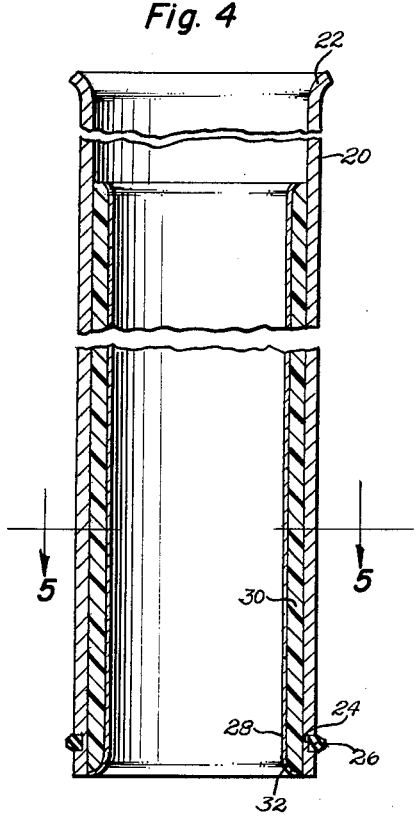
Figure 6:
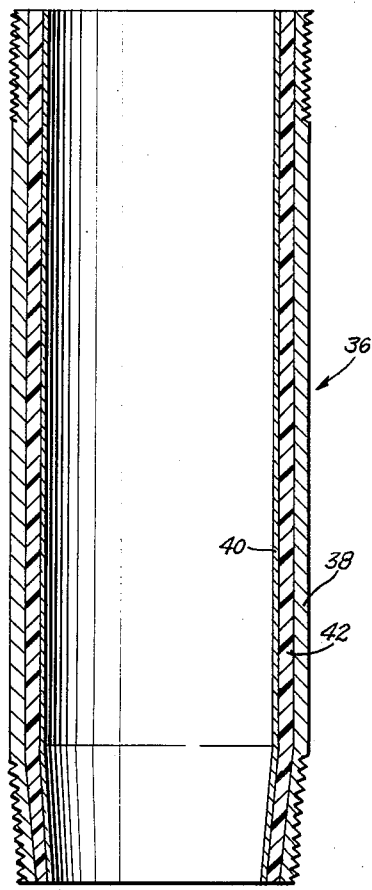
Figure 5:
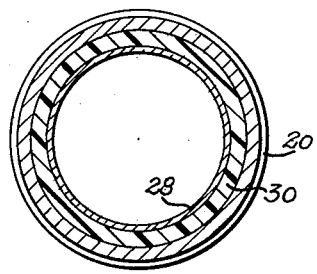

These objects and advantages of the invention will become apparent from the following detailed description taken in connection with the accompanying drawings, in which:

FIG. 1 is a fragmentary vertical sectional view of a deep well casing and water pump incorporating the novel features of the present invention, FIG. 2 is an enlarged view of the stuffing box portion of the assembly shown in FIG. 1, FIG. 3 is a perspective view of the differential plunger, removed from the pump rod, FIG. 4 is an enlarged view of the liner assembly, removed from the stuffing box, FIG. 5 is a view on line 5—5 of FIG. 4, and FIG. 6 is a view of the liner assembly adapted for use in the pump chamber of the pump.

Referring to the drawing, in FIG. 1, 10 designates the stuffing box, 12 the discharge pipe, and 14 the pump cylinder.

The liner assembly is shown in FIGS. 4 and 5 and it consists in a steel sleeve 20 flanged outwardly at 22 at its upper end and provided adjacent its lower end with a groove 24 in which is seated a sealing ring 26.

A brass liner 28 is within and spaced from the sleeve 20 and the space between the line 28 and sleeve 20 is filled with a plastic sleeve 30. The lower end of the liner 28 is flanged outwardly but does not make contact with the sleeve 20. This assembly surrounds the plunger 32 as at 34 in FIGS. 1 and 2, the plunger 32 being of conventional structure and shown in detail in FIG. 3.

In FIG. 6, a liner assembly 36 for use in the pump cylinder 14 is shown. It consists in a steel sleeve 38, a brass liner 40 and a plastic sleeve 42 separating the sleeve 38 and liner 40. The sleeve 38 has its upper and lower end portions threaded, as at 42, 44, for attachment to the adjacent pump cylinder parts.

It will be noted that the brass liners are electrically separated from their respective steel sleeves by the plastic sleeves. This effectively prevents galvanic action between the dissimilar metals and prevents corrosion of the brass liners from that cause.

Although the subject invention has been described with a certain degree of particularity, it is understood that the present disclosure has been made only by way of example and that numerous additions and changes in the details of construction, combination and arrangement may be resorted to without transcending the scope of the invention as hereinafter claimed.

What is claimed is:

1. In a well tube assembly including a stuffing box and a plunger on a pump rod slidable in said box, the improvement consisting of a liner assembly disposed so as to surround said plunger, said assembly comprising a steel sleeve, a brass liner within and spaced from said sleeve, and an electrically insulating sleeve disposed in the space between said sleeve and liner.

2. In a well tube assembly including a piston chamber, the improvement consisting of a liner assembly disposed within said cylinder, said assembly comprising a steel sleeve, a brass liner within and spaced from said sleeve, and an electrically insulating sleeve disposed in the space between said sleeve and liner.

3. In a well tube assembly including a stuffing box and a plunger on a pump rod slidable in said box, the improvement consisting of a liner assembly disposed so as to surround said plunger, said assembly comprising a steel sleeve, a brass liner within and spaced from said sleeve, and an electrically insulating sleeve fabricated of plastic disposed in the space between said sleeve and liner.

4. In a well tube assembly including a piston chamber, the improvement consisting of a liner assembly disposed within said cylinder, said assembly comprising a steel sleeve, a brass liner within and spaced from said sleeve, and an electrically insulating sleeve fabricated of plastic disposed in the space between said sleeve and liner.

No references cited.